United States Patent [19]
Atsumi et al.

[11] Patent Number: 6,139,815
[45] Date of Patent: Oct. 31, 2000

[54] HYDROGEN LITHIUM TITANATE AND MANUFACTURING METHOD THEREFOR

[75] Inventors: Yoshinori Atsumi; Masayuki Nagamine, both of Fukushima; Hiromi Koga, Mie; Tokuo Suita, Shiga, all of Japan

[73] Assignees: Sony Corporation, Tokyo; Ishihara Sangoy Kaisha, Ltd., Osaka, both of Japan

[21] Appl. No.: 09/254,828

[22] PCT Filed: Jul. 15, 1998

[86] PCT No.: PCT/JP98/03184

§ 371 Date: Jul. 14, 1999

§ 102(e) Date: Jul. 14, 1999

[87] PCT Pub. No.: WO99/03784

PCT Pub. Date: Jan. 28, 1999

[30] Foreign Application Priority Data

Jul. 15, 1997 [JP] Japan ................................. 9-190176

[51] Int. Cl.$^7$ ............................ C01G 23/00; H01B 1/02; H01M 4/58; C01B 6/04
[52] U.S. Cl. .................. 423/598; 420/900; 429/218.2; 252/519.2; 252/520.2; 252/520.21; 423/646; 423/658.2
[58] Field of Search .................... 423/598, 646, 423/658.2; 252/520.2, 519.2, 520.21; 420/900; 429/218.2

[56] References Cited

U.S. PATENT DOCUMENTS 5,240,646   8/1993   Gillet et al. .......................... 252/518

FOREIGN PATENT DOCUMENTS

| 58-172869 | 10/1983 | Japan . |
| 4-294060 | 10/1992 | Japan . |
| 9-219215 | 8/1997 | Japan . |

*Primary Examiner*—Steven P. Griffin
*Assistant Examiner*—Maribel Medina
*Attorney, Agent, or Firm*—Hill & Simpson

[57] ABSTRACT

Hydrogen lithium titanate prepared by an acid process of lithium titanate and having pH of 11.2 or smaller or hydrogen lithium titanate expressed by general formula $H_xLi_{y-x}Ti_zO_4$ (where $y \geq x > 0$, $0.8 \leq y \leq 2.7$ and $1.3 \leq z \leq 2.2$) is disclosed. Hydrogen lithium titanate may be employed as active materials of positive and negative electrodes of a non-aqueous electrolyte secondary battery thereby realizing a charging capacity greater than a theoretical capacity. It is preferable that hydrogen lithium titanate is formed into a particle shape and includes voids in the particles. It is preferable that the largest particle size is 0.1 μm to 50 μm and the specific surface area is 0.01 m$^2$/g to 300 m$^2$/g. Hydrogen lithium titanate of the foregoing type can be manufactured by bringing lithium titanate into contact with an acid, such as acetic acid, to substitute protons for lithium ions.

18 Claims, 2 Drawing Sheets

CHARGING/DISCHARGING CURVE

HYDROGEN LITHIUM TITANATE AND MANUFACTURING METHOD THEREFOR

FIELD OF THE INVENTION

The present invention generally relates to hydrogen lithium titanate and more specifically, to hydrogen lithium titanate prepared by substituting protons for a portion of lithium thereof and a manufacturing method therefor.

BACKGROUND OF THE INVENTION

In recent years, the advance of electronic technology has realized an improvement in the performance, size reduction and portable structures of a variety of electronic apparatuses. Also secondary batteries for use as the power sources for the electronic apparatuses must have high performance and reduced sizes.

As a new secondary battery which is capable of satisfying the foregoing requirements, a non-aqueous electrolyte secondary battery is expected to be employed. In particular, lithium-ion secondary batteries, which are able to charge and discharge lithium-ion, have energetically been developed and put into practical use.

A positive-electrode active material for the foregoing battery has mainly been any one of vanadium pentoxide, manganese oxide, lithium cobaltate acid, lithium nickelate acid and spinel type lithium manganate. The negative electrode is made of a carbon material, such as graphite. Thus, a high-voltage and high-energy-density battery has been put into practical use.

A battery of the type made of the above-mentioned materials, however, is unfit for use in a low voltage region not higher than 3 V.

It can be considered that reduction in the voltage required for each of the apparatuses will furthermore be attempted because of the advancement of the technology for developing the electronic apparatuses and reduction in the voltage required to operate ICs.

Under the foregoing circumstances, a battery incorporating a negative electrode containing spinel type lithium titanate has been combined with a solar cell so as to be put into practical use as a power source for a watch, which is operated at a voltage of about 1.5 V. The future trend of the above-mentioned combination in the market has received attention (see "Lithium-Ion Titanate Secondary Battery" Document No. N03-04, New Material, August 1996).

The above-mentioned battery system has an excellent cycle characteristic, over discharge resistance and a preservation characteristic. It can be considered that requirements for development of batteries having larger charging/discharging capacities will be imposed if 1.5 V batteries will be used more widely.

Hitherto, the characteristics of titanium oxide, which is a raw material of lithium titanate for forming a positive and negative electrode of a non-aqueous electrolyte secondary battery as an active material, exert a considerable influence on the characteristics of the battery. Therefore, research and development have energetically been reported.

Titanium oxide, which is the raw material, has some structure of brookite, rutile, anatase and so forth. A consideration is made that anatase titanium oxide is an advantageous raw material because of further excellent charging/discharging performance and a satisfactory cycle characteristic of the battery made from it.

As a known lithium compound advantageous as the material of the lithium-ion secondary battery, lithium titanate is known which is formed into any one of $Li_{2.67}Ti_{1.33}O_4$, $LiTi_2O_4$, $Li_{1.33}Ti_{1.66}O_4$, $Li_{1.44}Ti_{1.71}O_4$, $Li_{0.8}Ti_{2.2}O_4$ and the like. Among the foregoing lithium compounds, $Li_{1.33}Ti_{1.66}O_4$ has attracted attention because of its large charging/discharging capacity.

To obtain lithium titanate, a method has been employed in which a mixture of titanium oxide and a lithium compound is subjected to dry heat treatment at temperatures of 700° C. to 1600° C. (see, Japanese Patent Laid-Open No. 6-275263).

Thus-obtained mission lithium titanate $Li_{1.33}Ti_{1.66}O_4$ has a theoretical charging/discharging capacity of 175 mAh/g in one electronic reaction. However, materials commercially available at present have a charging/discharging capacity of about 130 mAh/g to about 150 mAh/g in 0.75 electronic reaction to 1.0 electronic reaction. That is, the value is excessively smaller than the theoretic capacity (see, Electrochemistry, p.p. 870 to 875, vol. 62, No. 9 (1994)).

In recent years, notebook personal computers, portable CD players, MD players and so forth have widely been used. Therefore, secondary batteries, which are mounted as the power sources of the foregoing apparatuses, are considerably required. Moreover, size reduction causes a requirement for a longer operating time and longer lifetime to arise. Therefore, a material having a large charging/discharging capacity is required considerably.

SUMMARY OF THE INVENTION

Inventors of the present invention have investigated a variety of materials to obtain a material having a satisfactorily large charging/discharging capacity. As a result of this investigation, the inventors discovered that; hydrogen lithium titanate obtained by substituting protons for lithium ions of lithium titanate has a charging/discharging capacity which is enlarged in proportion to pH, that is, proton substitution quantity x. Moreover, a material having a structure in which voids are formed in the particles enables the charging/discharging capacity to furthermore be enlarged. Thus, the present invention has been achieved.

That is, hydrogen lithium titanate according to the present invention is characterized in that pH is 11.2 or smaller and expressed by a general formula (where $y \geq x > 0$, $0.8 \leq y \leq 2.7$ and $1.3 \leq z \leq 2.2$).

The hydrogen lithium titanate can be prepared by processing lithium titanate with an acid.

That is, a method of preparing hydrogen lithium titanate according to the present invention includes the step of bringing lithium titanate expressed by a general formula $Li_yTi_zO_4$ (where $0.8 \leq y \leq 2.7$ and $1.3 \leq z \leq 2.2$) into contact with an acid to substitute protons for lithium ions so that hydrogen lithium titanate expressed by the general formula $H_xLi_{y-x}Ti_zO_4$ (where $y \geq x > 0$, $0.8 \leq y \leq 2.7$ and $1.3 \leq z \leq 2.2$) is prepared.

It is preferable that the pH of the hydrogen lithium titanate subjected to the acid process is less than 11.6. More preferably, the pH of the hydrogen lithium titanate ranges from 5.6 to 11.2 and most preferably, ranges from 7.5 to 11.2. The inventors discovered the pH is one parameter for adjusting the charging/discharging performance.

Hydrogen lithium titanate according to the present invention may be employed as a material for forming the positive electrode and the negative electrode of a lithium-ion secondary battery. The lithium-ion secondary battery being set to a low potential not higher than 3 V. That is, hydrogen lithium titanate has a capacity which is considerably larger than the theoretical charging/discharging capacity of lithium titanate.

The reason that a material having a capacity considerably larger than the theoretical charging/discharging capacity can be prepared by dint of an effect of the proton substitution process will now be described. Basically, lithium titanate has a defect spinel structure. Voids in the defect portions have been charged with doped lithium ions supplied from a lithium source disposed at a counter electrode. Therefore, the capacity is usually not larger than a capacity of 175 mAh/g, which is a theoretical capacity in one electronic reaction. However, lithium titanate subjected to the proton substitution process has a structure where protons are substituted for a portion of lithium which constitutes crystal lattices. Therefore, lithium and protons are exchanged for each other. Thus, voids into which lithium ions can be introduced can be created in crystal lattices of sites A and B which are basically limited voids. As a result of the above-mentioned action, it can be estimated that a material having a charging/discharging capacity which is considerably larger than the theoretical capacity can be obtained.

Hydrogen lithium titanate according to the present invention enables an amount of voids into which lithium ions can be introduced to be enlarged. This results from recognizing and using a characteristic that a large specific surface area can be realized (the reaction area can be enlarged) in inverse proportion to the firing temperatures and the proton substitution process is thereby performed. Therefore, the capacity can be enlarged to be considerably larger than 175 mAh/g, which is the theoretical charging/discharging capacity of lithium titanate in one electronic reaction. Therefore, a novel material is obtained as compared with conventional lithium titanate materials. Thus, a significant industrial advantage can be obtained from the present invention.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides a hydrogen lithium titanate compound and a method of manufacturing same. The hydrogen lithium titanate is preferably used as an active material for positive and negative electrodes of a non-aqueous electrolyte secondary battery. The hydrogen lithium titanate can be prepared by an acid process of lithium titanate. Preferably, the hydrogen lithium titanate has a pH of 11.6 or smaller. In an embodiment, the hydrogen lithium titanate is expressed by the general formula $H_xLi_{y-x}Ti_zO_4$, where $y \geq x > 0$, $0.8 \leq y \leq 2.7$ and $1.3 \leq z \leq 2.2$. With the use of hydrogen lithium titanate in accordance with the present invention, the non-aqueous electrolyte secondary battery exhibits a charging/discharging capacity greater than a theoretical capacity.

The present invention also provides a method of manufacturing hydrogen lithium titante. The method involves the step of bringing lithium titanate into contact with an acid to substitute protons for lithium ions so that hydrogen lithium titanate is prepared. Preferably, the lithium titanate is expressed by the general formula $Li_yTi_zO_4$, where $0.8 \leq y \leq 2.7$ and $1.3 \leq z \leq 2.2$, and the resulting hydrogen lithium titanate is expressed by the general formula $H_xLi_{y-x}Ti_zO_4$, where $y \geq x > 0$, $0.8 \leq y \leq 2.7$ and $1.3 \leq z \leq 2.2$.

The pH of lithium titanate realized after an acid process, that is, the pH of obtained hydrogen lithium titanate, can be used as a parameter for adjusting the charging/discharging capacity of hydrogen lithium titanate.

Specifically, it is preferable that the pH of the hydrogen lithium titanate, which can be prepared by the acid process, is smaller than 11.6, more preferably not greater than 11.2.

The pH of hydrogen lithium titanate is measured as follows.

Initially, 30 g of hydrogen lithium titanate is introduced into 50 ml of distilled water, followed by boiling a solution at a temperature of 100° C. for 5 minutes. After the solution has been cooled, water into which hydrogen lithium titanate has been introduced is filtered with filtering paper. The pH of obtained filtrate is measured by a pH meter at temperatures of 20° C. or lower.

When hydrogen lithium titanate has a suitable pH, which is measured as described above and which satisfies the above-mentioned range, a significant charging/discharging performance of a battery can be realized. The reason for this lies in that the pH realized after the acid process has been performed is able to serve as one parameter for adjusting the charging/discharging performance, as described above. That is, the proton substitution quantity is enlarged in proportion to the concentration in the acid process. As a result, the pH is shifted to the acid side. If the concentration in the acid process is low, an alkaline pH is realized. Thus, the proton substitution quantity is reduced.

When the pH satisfies a certain specific range, hydrogen lithium titanate has a crystal structure advantageous for charging/discharging, that is, a crystal structure having many spaces into which lithium can be introduced.

The range of the pH according to the present invention is estimated to be one of indexes, indicating a fact that the crystal structure advantageous for charging/discharging has been formed. Therefore, use of hydrogen lithium titanate having the above-mentioned pH as the material for forming the negative electrode enables an excellent charging/discharging performance to be obtained. In a preferred embodiment, the pH range for hydrogen lithium titanate is 5.6 to 11.2.

The pH has a close relationship with proton substitution of lithium titanate. Therefore, hydrogen lithium titanate according to the present invention is considered to be lithium titanate subjected to proton substitution.

In view of the foregoing, hydrogen lithium titanate according to the present invention is a compound expressed by a general formula $H_xLi_{y-x}Ti_zO_4$. When hydrogen lithium titanate is used, hydrogen lithium titanate in a single phase may be used or a mixture of hydrogen lithium titanate and titanium oxide may be used.

It is preferable that the values of y and z in the above-mentioned general formula are $0.8 \leq y \leq 2.7$ and $1.3 \leq z \leq 2.2$, respectively. It is preferable that the proton substitution quantity x satisfies a range $y \geq x > 0$, more preferably $0.9y \geq x \geq 0.05y$ and most preferably $0.8y \geq x \geq 0.1y$. A material in which protons have been substituted for all of the lithium ions has a composition expressed as y=x, which is included in the scope of hydrogen lithium titanate according to the present invention. If the proton substitution quantity x is smaller than the above-mentioned range, the charging/discharging capacity cannot satisfactorily be enlarged.

It is preferable that hydrogen lithium titanate according to the present invention is formed into particles. In the foregoing case, the shape of the particle is not limited to a specific shape. A variety of shapes including the particle shape, and a plate-like shape may be employed. In particular, hydrogen lithium titanate having voids in the particles thereof is a preferred material because the charging/discharging capacity can furthermore be enlarged.

The existence of the voids can be confirmed by measuring the amount of voids. If the amount of the voids is 0.005 ml/g or greater, existence of voids in the particles can be confirmed. A preferred range for the amount of voids is 0.01 ml/g to 1.5 ml/g, more preferably 0.01 ml/g to 0.7 ml/g. When a laminate structure of particles is employed, a large quantity of voids can be formed in the layers. Hydrogen lithium titanate according to the present invention has a size controlled to be formed into a fine particle shape. Although the largest particle size may arbitrarily be designed, it is preferable that the particle size satisfies a range from 0.05 $\mu$m to 50 $\mu$m in viewpoints of easiness in use as powder and realizing a satisfactory characteristic of the battery, more preferably a range from 0.05 $\mu$m to 10 $\mu$m and most preferably a range from 0.1 $\mu$m to 1 $\mu$m.

It is preferable that the specific surface area satisfies a range from 0.01 m$^2$/g to 300 m$^2$/g, more preferably 0.1 m$^2$/g to 150 m$^2$/g, most preferably 0.5 m$^2$/g to 100 m$^2$/g.

A manufacturing method according to the present invention involves the step of bringing lithium titanate expressed by the general formula Li$_y$Ti$_z$O$_4$ (where $0.8 \leq y \leq 2.7$ and $1.3 \leq z \leq 2.2$) into contact with an acid. The protons are thereby substituted for lithium ions to form hydrogen lithium titanate expressed by the general formula $H_xLi_yTi_zO_4$ (where $y \geq x > 0$, $0.8 \leq y \leq 2.7$ and $1.3 \leq z \leq 2.2$).

Lithium titanate and the acid can be brought into contact with each other by, for example, suspending lithium titanate in a solvent, such as water, alcohol, cellosolve, methylethylketone, xylene or toluene and by then adding the acid. The acid may be an inorganic acid, such as hydrochloric acid, nitric acid or sulfuric acid, or an organic acid, such as acetic acid or formic acid without any limitation. In preferred embodiments acetic acid, hydrochloric acid or nitric acid is employed.

Lithium titanate for use in the manufacturing method according to the present invention is expressed by the general formula Li$_y$Ti$_z$O$_4$. When the values of y and z satisfy $0.8 \leq y \leq 2.7$ and $1.3 \leq z \leq 2.2$, respectively, a preferred composition can be prepared. For example, Li$_{2.67}$Ti$_{1.33}$O$_4$LiTi$_2$O$_4$, Li$_{1.33}$Ti$_{1.66}$O$_4$, Li$_{1.44}$Ti$_{1.71}$O$_4$, Li$_{0.8}$Ti$_{2.2}$O$_4$ are exemplified. The shape, of particle may be any one of a variety of shapes including a particle shape and a plate-like shape. The particle shape of lithium titanate causes the particle shape of hydrogen lithium titanate to be formed.

To obtain lithium titanate, a variety of methods can be utilized. For example, a method (1) may be employed with which a mixture of titanium oxide and a lithium compound is subjected to heat treatment at temperatures of 500° C. to 900 ° C. so as to prepare granular lithium titanate. Another method (2) may be employed that involves three steps. These steps are: a first step in which a titanium compound and an ammonia compound are caused to react with each other in an aqueous solution to obtain a titanate compound; a second step in which the titanate compound and a lithium compound are caused to react with each other in an aqueous solution to obtain lithium titanate hydrate; and a third step in which the lithium titanate hydrate is subjected to heat treatment. Thus, plate-like lithium titanate can be prepared. The foregoing method (1) is a preferred method because lithium titanate can easily be prepared with a low cost. A preferred heat treatment range is 600° C. to 800° C., more preferably 650° C. to 750° C.

The method (2) is a preferred method because the obtained lithium titanate has particles, the size and shape of which are controlled, and enables hydrogen lithium titanate having voids in the particles thereof to be obtained.

In the foregoing method (1), the titanium oxide is any one of a variety of titanium oxides, such as anatase titanium oxide, rutile titanium oxide, amorphous titanium oxide, metatitanic acid or orthotitanic acid, titanate hydroxide, hydrous titanium oxide and hydrate titanium oxide. The lithium compound may be, for example, any one of lithium hydroxide, lithium carbonate, lithium nitrate and lithium sulfate. To prepare a mixture of titanium oxide and the lithium compound, any one of the following methods may be employed: a method by which titanium oxide and the lithium compound are simply mixed with each other by a dry method; a method by which the materials are mixed in an aqueous solution, such as water or water-alcohol, and the mixture is dried; or a method by which the lithium compound is added to slurry of titanium oxide suspended in the aqueous solution followed by evaporating to dryness and extinguishing the material.

The first step of the method (2) is a step for causing the titanium compound and the ammonia compound to react with each other in the aqueous solution to obtain the titanate compound. The titanate compound is a material having a structure that ammonium ions or the like are substituted for a portion of orthotitanic acid or protons of orthotitanic acid. The titanium compound may be an inorganic titanium compound, such as titanium sulfate, titanyl sulfate or titanium chloride, or an organic titanium compound, such as titanium alkoxide. In particular, it is preferable that titanium chloride is employed, which is able to reduce an amount of impurities in hydrogen lithium titanate. The ammonia compound may be ammonia water, ammonium carbonate, ammonium sulfate or ammonium nitrate. If an alkali metal compound, such as a sodium compound or a potassium compound, is employed in place of the ammonia compound, sodium or potassium elements remain in the obtained titanium compound. Thus, calcination among particles takes place when the following heating and dehydration processes are performed. In this case, sintering takes place among particles when a following heating and dehydration process is performed. Thus, sizes and shapes of particles undesirably become nonuniform.

The aqueous solution may be water or water-alcohol. When the titanium compound and the ammonium compound are mixed with each other in the aqueous solution, the reaction proceeds. Thus, a titanate compound, which is a compound having a structure in which ammonium ions are substituted for orthotitanic acid (H$_4$TiO$_4$) or its protons and expressed as H$_{4-n}$(NH$_4$)$_n$TiO$_4$, can be obtained. An amount of substitution of ammonium ion in H$_{4-n}$(NH$_4$)$_n$TiO$_4$ can arbitrarily be changed by adjusting conditions including the concentration of ammonium ions, that of free hydroxyl groups, that of hydrogen ions and reaction temperatures. The particle size of the obtained titanate compound exerts an influence upon the particle size of lithium titanate which will be obtained in a following step. Therefore, the first step is an important step. To prepare the titanate compound in the form of fine particles and to prepare lithium titanate in the form of fine particles, the reaction temperature is set to be 0° C. to 50° C., preferably 5° C. to 40° C., and more preferably 10° C. to 30° C.

The thus-obtained titanate compound is filtered, washed with water, cleaned with an acid and dried, as necessary so as to be subjected to the following process in the second step.

The second step is a step in which the titanate compound and the lithium compound obtained in the first step are caused to react in an aqueous solution so that lithium titanate hydrate is obtained. The lithium compound may be a water-soluble lithium compound, which is exemplified by lithium hydroxide, lithium carbonate, lithium nitrate and lithium sulfate. When the lithium compound and the titanate compound are mixed with each other in an aqueous solution, the reaction proceeds. The reaction temperature is 50° C. or higher, preferable 100° C. or higher, more preferably 100° C. to 250° C. and most preferably 130° C. to 200° C. When the reaction is performed in the above-mentioned temperature range, lithium titanate hydrate having excellent crystallinity can be obtained.

When the reaction is performed at temperatures not lower than 100° C., it is preferable that the lithium compound and the titanate compound are admitted into an autoclave, followed by subjecting the materials to a hydrothermal process under saturated vapor or under pressure. As a result of the hydrothermal process, lithium titanate hydrate having voids in the particles thereof can be obtained.

The thus-obtained lithium titanate hydrate is filtered, and then washed and dried, as necessary. The drying temperature may be an arbitrary level. However, the level must be lower than a temperature at which lithium titanate hydrate discharges crystal water. It is preferable that the temperature is 30° C. to 200° C.

The third step is a step in which lithium titanate hydrate obtained in the second step is subjected to heat treatment so that lithium titanate expressed by the general formula $Li_y Ti_z O_4$ (where $0.8 \leq y \leq 2.7$ and $1.3 \leq z \leq 2.2$) is obtained. The temperature in the heat treatment must be not lower than the temperature at which lithium titanate hydrate discharges crystal water. Although the temperature is considered to vary depending on the composition of lithium titanate hydrate and the quantity of crystal water, it is preferable that the temperature is about 200° C. or higher. It is preferable that the temperature is about 200° C. to about 800° C. to obtain lithium titanate having voids. It is preferable that the temperature is 250° C. to 700° C. to obtain lithium titanate having many voids, more preferably 350° C. to 650° C. to obtain close lithium titanate. The heat treatment must be performed at temperatures not lower than 800° C. If the heat treatment is preformed at 1300° C. or higher, lithium titanate in which particles are greatly sintered can be obtained.

The above-mentioned hydrogen lithium titanate may be employed as an active material for a battery. When a counter electrode is made of a material to which lithium can be doped and dedoped, a battery having a large charging/discharging capacity can be manufactured. That is, hydrogen lithium titanate according to the present invention can be used as a material for forming a positive electrode as well as an active material for a negative electrode. When the hydrogen lithium titanate is so used, a capacity considerably larger than the theoretical capacity of the active material can be realized. As a result, the charging/discharging capacity of a conventional battery can be considerably enlarged.

By way of example, and not limitation, specific examples of the present invention will now be described such that results of experiments are described. As a matter of course, the present invention is not limited to the foregoing examples.

Investigation of pH

Initially, lithium titanate subjected to the acid process was investigated from a viewpoint of pH.

EXAMPLE 1

Initially, a saturated water solution of LiOH was mixed with anatase type $TiO_2$ (purity 99.8%) in such a manner that a Li atomic ratio $R_{Li/Ti}$ was 1.10. Then, the mixture was pulverized in a mortar. Then, powder obtained by the pulverization process was baked at 800° C. for 8 hours in an oxygen atmosphere so that lithium titanate $Li_{4/3}Ti_{5/3}O_4$ was prepared. Then, the obtained lithium titanate was filtered with a 75-mesh filter, after which the lithium titanate was allowed to pass through the filter and was washed with distilled water. Then, lithium titanate was subjected to an acid process using 1.5 wt % acetic acid solution. Then, the lithium titanate subjected to the foregoing process was dried at a temperature of 120° C. for 8 hours so that hydrogen lithium titanate was obtained.

The pH of the obtained hydrogen lithium titanate was measured as follows.

Initially, 30 g of hydrogen lithium titanate was admitted into 50 ml of distilled water, followed by boiling the material at 100° C. for 5 minutes. After the material was cooled, water into which hydrogen lithium titanate was admitted was filtered with filter paper. The pH of the obtained supernatant was measured by a pH meter at a temperature of 20° C. or lower. The pH of the material was 9.2.

EXAMPLE 2 AND EXAMPLE 3

Hydrogen lithium titanate was obtained similarly to Example 1 except for the concentration of acetic acid for use in the acid process. The pH of each of the obtained materials was 8.0 and 5.6, respectively.

COMPARATIVE EXAMPLE 1

A firing process was performed so that lithium titanate was prepared similarly to Example 1. Then, non-processed lithium titanate was employed as a comparative example. The pH of the material was 12.0.

COMPARATIVE EXAMPLE 2

A firing process was performed so that lithium titanate was prepared similarly to Example 1. Then, lithium titanate was washed with distilled water. Thus, a material according to a comparative example was obtained similarly to Example 1 except for the acid process using acetic acid being omitted. The pH of the obtained material was 11.6.

The obtained materials were employed to manufacture coin batteries to be evaluated.

Each of the coin batteries to be evaluated was structured such that an outer can, which accommodated negative-electrode pellet and a collector, and an outer cup in which a counter electrode was accommodated, were stacked through a separator. Then, the outer ends of the outer can and the outer cup were caulked through a gasket.

The coin battery to be evaluated was manufactured as follows.

Initially, 90 parts by weight of the material ($Li_{4/3}Ti_{5/3}O_4$) according to each of the examples and the comparative examples, 5 parts by weight of graphite which served as a conductive material and 5 parts by weight of polyvinylidene fluoride PVdF serving as a binder were added to one another. Then, the material was kneaded and dispersed in a mortar. Then, n-methylpyrolidone in a small quantity was successively added so that a negative electrode mix in the form of slurry was prepared.

The negative electrode mix was dried at a temperature of 120° C. for 2 hours, and then pulverized in a mortar so that powder mix was obtained. The powder mix was charged into an electrode collector in the form of a net made of stainless steel (SUS304), followed by compression-molding the powder mix to have an outer diameter of 15.5 mm and a thickness of 0.2 mm. Then, the molded material was dried in a vacuum at a temperature of 120° C. for 2 hours. Thus, negative electrode pellet was prepared.

Then, metal lithium, which was used to form the counter electrode and which had a thickness of 1.0 mm, was punched by a circular cutter having an outer diameter of 16.5 mm, and then crimped to the outer cup. A sealing gasket made of polypropylene was attached to the outer cup.

The separator in the form of a fine-porous polypropylene film having a predetermined size realized by punching and a thickness of 50 µm was placed on the metal lithium crimped to the outer cup. Then, an electrolyte, which was obtained by, at a ratio of 1 mole/l, dissolving $LiPF_6$ in a solvent in which propylene carbonate and methylethyl carbonate were mixed with each other at a volume ratio of 50:50, was dripped from an upper portion. Then, the negative electrode pellet prepared in the previous step was placed on the separator. Then, the outer can was placed on the separator, followed by performing caulking and closely sealing the outer ends. Thus, the coin battery to be evaluated was manufactured, the coin battery having an outer diameter of 20 mm and a height of 1.6 mm. The outer can was manufactured by nickel-plating a can made of stainless steel (SUS304). A theoretical charging capacity of each of the manufactured batteries was 175 mAh/g.

The batteries were charged with a constant electric current of 1 mA at ambient temperatures to a level of 2.5 V. Then, the batteries were discharged to a level of 1.0 V. The charging capacities in the foregoing charging/discharging process are shown in Table 1. As representative examples, charging/discharging curve of the batteries to be evaluated using hydrogen lithium titanate according to Example 2, Comparative Examples 1 and 2 are shown in FIG. 1.

TABLE 1

|  | Process | pH | Charging Capacity (mAh/g) |
|---|---|---|---|
| Example 1 | Process Using Distilled Water + Process Using Acetic Acid | 9.2 | 171 |
| Example 2 | Process Using Distilled Water + Process Using Acetic Acid | 8.0 | 200 |
| Example 3 | Process Using Distilled Water + Process Using Acetic Acid | 5.6 | 271 |
| Comparative Example 1 | No Process | 12.0 | 165 |
| Comparative Example 2 | Only Process Using Distilled Water | 11.6 | 168 |

Figure 1:
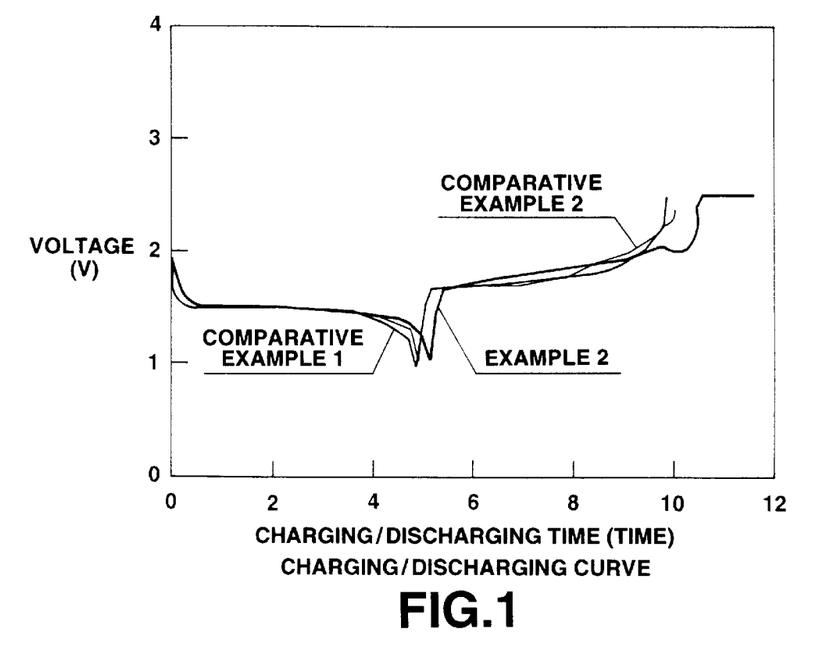
FIG. 1 is a graph showing the characteristic of the difference in charging/discharging curves caused from a fact whether or not an acid process is performed.

As can be understood from FIG. 1, the battery according to Example 2 containing hydrogen lithium titanate, which was obtained by subjecting lithium titanate to both of the cleaning process and the acid process, enables longer charging/discharging time to be realized as compared with the battery according to Comparative Example 1, which was subjected to no process and the battery according to Comparative Example 2, which was subjected to only the cleaning process.

As shown in Table 1, the batteries according to Examples 1 to 3 have a charging capacity that is considerably larger than the theoretical value (175 mAh/g).

Thus, definition of the pH of hydrogen lithium titanate can be used as a parameter with which the charging capacity can be estimated.

Figure 2:
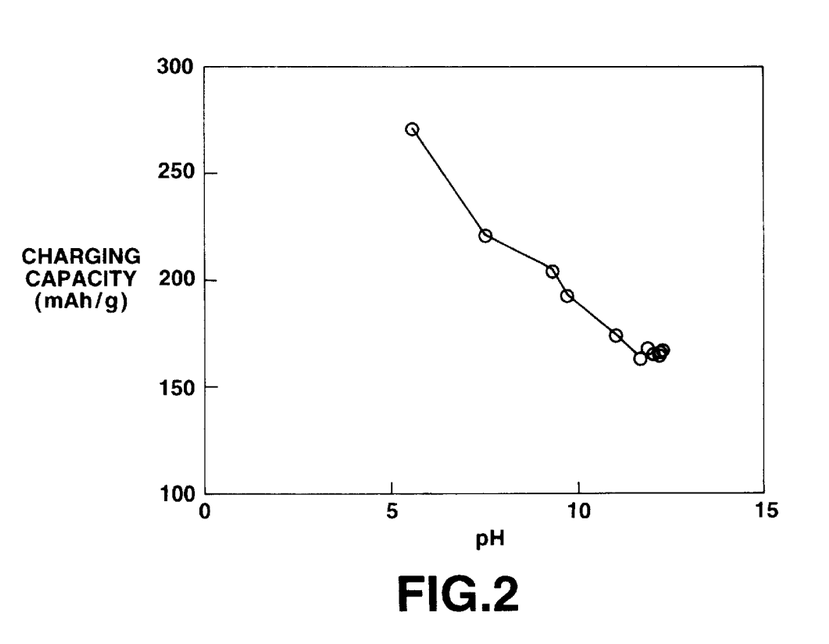
FIG. 2 is a graph showing dependency of the charging/discharging capacity of hydrogen lithium titanate on pH.

FIG. 2 shows the relationship between the pH of the lithium titanate (hydrogen lithium titanate) and the charging capacity. A fact can be understood that the charging capacity is rapidly enlarged when the pH is made to be 12.0 or smaller. It is preferable that the pH is 5.6 to 11.2.

Investigation of Substitution of Protons

From the above-mentioned experiments the inventors determined that the acid process of lithium titanate causes the pH to be changed. This pH change exerts an influence on the characteristic.

In this experiment, the inventors investigated the performance that was realized by dint of substitution of the protons caused by the acid process.

EXAMPLE 4

(1) Preparation of Lithium Titanate (1-1) Preparation of Titanate Compound

Ammonia water, the concentration of which was 6.01 mole/liter, in a quantity of 8.988 liters was admitted into a 25 liter glass reaction vessel. While the ammonia water was being stirred and the solution was being cooled with ice in such a manner that the temperature of the solution was kept to be 10° C. to 20° C., 9.01 liter titanium tetrachloride having a concentration of 1.25 mole/liter was dispersively added for 1.5 hours. The concentration of free ammonia at the moment of time when the addition was completed was 0.5 mole/liter. The concentration of the solid portions was 50 g/liter in $TiO_2$ terms. The pH was 8.3.

After the solution was aged for one hour, hydrochloride solution in a quantity of 1.3 liters and having a concentration of 5 mole/liter was dispersively added for 1 hour so that the pH was made to be 4, then, the pH was maintained at 4 and the solution was matured for one hour. To maintain the pH at 4 during the maturation, 5 mole/liter hydrochloride solution in a quantity of 0.42 liter was dispersively added. After the maturation process was completed, the solution was filtered and washed with water. Thus, titanate compound was obtained.

(1-2) Preparation of Lithium Titanate Hydrate

Pure water was added to the titanate compound obtained in the process (1-1), and then the solution was stirred and dispersed by a large-size mixer. Thus, water dispersion solution in a quantity of 17 liters was obtained. The concentration of solid portions in the water dispersion solution was 45.38 g/liter in $TiO_2$ terms. The pH was 6.7. Then, water dispersion solution in a quantity of 13.882 liters and pure water in a quantity of 0.118 liters were admitted into a 25 liter glass reaction vessel. While the solution was being stirred and the solution was being cooled with ice in such a manner that the temperature of the solution was made to be 10° C. to 20° C., 2.01 mole/liter lithium hydroxide solution in a quantity of 4.00 liters was dispersively added for one hour. Then, the solution was matured for one hour. The concentration of the solid portions after the addition process was 35 g/liter in $TiO_2$ terms. The molar ratio Li/Ti was 1.02, and the pH was 11.8.

Matured slurry was admitted into a 25-liter autoclave made of stainless steel. While the slurry was being stirred, the slurry was subjected to a hydrothermal process at a temperature of 190° C. for 4 hours. The viscosity of the slurry subjected to the hydrothermal process was raised to 2140 cp at 25° C.

Then, the slurry subjected to the hydrothermal process was filtered, and then it was not cleaned. The slurry was dried at a temperature of 110° C. so that lithium titanate hydrate ($Li_{1.33}Ti_{1.66}O_4 \cdot H_2O$) was obtained.

(1-3) Preparation of Lithium Titanate

Lithium titanate hydrate obtained in the step (1-2) was pulverized, and then the pulverized material was admitted into a baking container made of quartz so as to be fired at 550° C. for 3 hours in the atmosphere. Thus, lithium titanate (sample A) was obtained.

(2) Preparation of Hydrogen Lithium Titanate

Pure water in a quantity of 500 ml and 100 g lithium titanate, which was sample A, were admitted into a 1-liter glass reaction vessel. While the solution was being stirred, 67 ml of 10 wt % acetic acid solution was collectively added so as to be caused to react at 25° C. for one hour. Then, the solution was filtered and washed, and then the solution was dried in the atmosphere at a temperature of 110° C. for 3 hours. Thus, hydrogen lithium titanate (sample A1) was obtained. The pH was 11.2.

EXAMPLE 5

A process similar to that according to Example 4 was performed except for a process in which 10 wt % acetic acid solution in a quantity of 133 ml was collectively added and the solution was caused to react at 60° C. for one hour in place of the process (2) according to Example 4 in which 67 ml of 10 wt % acetic acid solution was collectively added and the solution was caused to react at the temperature of 25° C. for one hour. Thus, hydrogen lithium titanate (sample A2) was obtained. The pH was 9.3.

EXAMPLE 6

A process similar to that according to Example 4 was performed except for a process in which 10 wt % acetic acid solution in a quantity of 200 ml was collectively added and the solution was caused to react at 60° C. for one hour in place of the process (2) according to Example 4 in which 67 ml of 10 wt % acetic acid solution was collectively added and the solution was caused to react at the temperature of 25° C. for one hour. Thus, hydrogen lithium titanate (sample A3) was obtained. The pH was 8.0.

EXAMPLE 7

A process similar to that according to Example 4 was performed except for a process in which 20 wt % acetic acid solution in a quantity of 167 ml was collectively added and the solution was caused to react at 60° C. for one hour in place of the process (2) according to Example 4 in which 67 ml of 10 wt % acetic acid solution was collectively added and the solution was caused to react at the temperature of 25° C. for one hour. Thus, hydrogen lithium titanate (sample A4) was obtained. The pH was 7.8.

EXAMPLE 8

A process similar to that according to Example 4 was performed except for a process in which 40 wt % acetic acid solution in a quantity of 167 ml was collectively added and the solution was caused to react at 60° C. for one hour in place of the process (2) according to Example 4 in which 67 ml of 10 wt % acetic acid solution was collectively added and the solution was caused to react at the temperature of 25° C. for one hour. Thus, hydrogen lithium titanate (sample A5) was obtained. The pH was 7.6.

EXAMPLE 9

A process similar to that according to Example 4 was performed except for a process in which 5 mole/liter hydrochloric acid solution in a quantity of 167 ml was dispersively added by spending one hour and the solution was caused to react at 60° C. for one hour in place of the process (2) according to Example 4 in which 67 ml of 10 wt % acetic acid solution was collectively added and the solution was caused to react at the temperature of 25° C. for one hour. Thus, hydrogen lithium titanate (sample A6) was obtained. The pH was 7.4.

EXAMPLE 10

A process similar to that according to Example 4 was performed except for a process in which 5 mole/litter hydrochloric acid solution in a quantity of 200 ml was dispersively added for one hour and the solution was caused to react at 60° C. for one hour in place of the process (2) according to Example 4 in which 67 ml of 10 wt % acetic acid solution was collectively added and the solution was caused to react at 25° C. for one hour. Thus, hydrogen lithium titanate (sample A7) was obtained. The pH was 5.6.

COMPARATIVE EXAMPLE 3

Lithium titanate, which was sample A obtained in the process (1) according to Example 4, was employed as a sample according to a comparative example. The pH was 11.6.

EXAMPLE 11

(1) Preparation of Lithium Titanate

A process similar to that according to Example 1 was performed except for a process in which firing was performed at 625° C. for 3 hours in place of the process (1-3) according to Example 1 in which firing was performed at 550° C. for 3 hours. Thus, lithium titanate (sample B) was obtained.

(2) Preparation of Hydrogen Lithium Titanate 500 mls of pure water and 100 gs of lithium titanate which was sample B were admitted into a 1 liter glass reaction vessel. While the solution was being stirred, 133 ml of 10 wt % acetic acid solution was collectively added so as to be caused to react at 60° C. for one hour. Then, the solution was filtered, washed and dried in the atmosphere at 110° C. for 3 hours. Thus, hydrogen lithium titanate (sample B) was obtained. The pH was 9.2.

EXAMPLE 12

A process similar to that according to Example 11 was performed except for a process in which 20 wt % acetic acid solution in a quantity of 167 ml was collectively added so as to be caused to react at 60° C. for one hour in place of the process (2) according to Example 11 in which 10 wt % acetic acid solution in a quantity of 133 ml was collectively added so as to be caused to react at 60° C. for one hour. Thus, hydrogen lithium titanate (sample B2) was obtained. The pH was 8.2.

EXAMPLE 13

A process similar to that according to Example 11 was performed except for a process in which 5 mole/liter hydrochloric acid solution in a quantity of 178 ml was collectively added so as to be caused to react at 60° C. for one hour in place of the process (2) according to Example 11 in which 10 wt % acetic acid solution in a quantity of 133 ml was collectively added so as to be caused to react at 60° C. for one hour. Thus, hydrogen lithium titanate (sample B3) was obtained. The pH was 7.5.

COMPARATIVE EXAMPLE 4

Lithium titanate, which was sample B obtained in the process (1) according to Example 11, was employed as a sample according to a comparative example. The pH was 12.3.

EXAMPLE 14

(1) Preparation of Lithium Titanate

Titanium oxide hydrate (C-II trade name of Ishihara), the weight of which was 500 g in $TiO_2$ terms, was admitted into a 3 liter plastic beaker so that slurry was prepared. Then, 3.00 mole/liter lithium hydroxide in a quantity of 1.815 liters was added, followed by stirring the solution at ambient temperatures for 4 hours. The slurry was evaporated to dryness at 150° C. in the atmosphere. The dry cake was ground, and then fired at 700° C. in the atmosphere for 3 hours. Thus, lithium titanate (sample C) was obtained.

(2) Preparation of Hydrogen Lithium Titanate

Pure water in a quantity of 500 ml and 100 g lithium titanate which was sample C were admitted into a 1 liter glass reaction vessel. While the solution was being stirred, 133 ml of 10 wt % acetic acid solution was collectively added so as to be caused to react at 60° C. for one hour. Then, the solution was filtered and then dried in the atmosphere at a temperature of 110° C. for 3 hours. Thus, hydrogen lithium titanate (sample C1) was obtained. The pH was 8.9.

EXAMPLE 15

A process similar to that according to Example 14 was performed except for a process in which 5 mole/liter hydrochloric acid solution in a quantity of 86 ml was dispersively added for one hour and the solution was caused to react at 60° C. for one hour in place of the process (2) according to Example 14 in which 133 ml of 10 wt % acetic acid solution was collectively added and the solution was caused to react at the temperature of 60° C. for one hour. Thus, hydrogen lithium titanate (sample C2) was obtained. The pH was 8.3.

COMPARATIVE EXAMPLE 5

Hydrogen lithium titanate, which was sample C obtained in the process (1) according to Example 14, was employed as a comparative example 4. The pH was 11.5.

COMPARATIVE EXAMPLE 6

A process similar to that according to Example was performed except for firing was performed at 810° C. for 3 hours in place of the process according to Example 4 in which firing was performed at 550° C. for 3 hours. Thus, lithium titanate (sample D) was obtained. The pH was 3.7.

Evaluation of Characteristics

The chemical compositions Li and Ti of samples A1 to A7, B1 to B3, C1, C2 and A to C according to Examples 4 to 15 and Comparative Examples 3 to 6, respectively, were detected by chemical analysis. The largest particle size was read by electron micrograph. The specific surface area and an amount of voids were measured by using BELLSOAP 28 manufactured by Nihon Bell. The H (proton) substitution quantity was obtained by TG-DTA thermal analysis as follows: in a TG-DTA curve, reduction in a quantity caused from an endothermic reaction occurring by dint of removal of protons as water was observed at positions adjacent to 213° C. and 277° C. to correspond to protons of sites B and A of the spinel structure. The foregoing reduction in quantity was used to calculate the proton substitution quantity. The proton substitution quantity calculated by the above-mentioned method accurately corresponds to the residue of Li previously detected by the chemical analysis.

Figure 3:
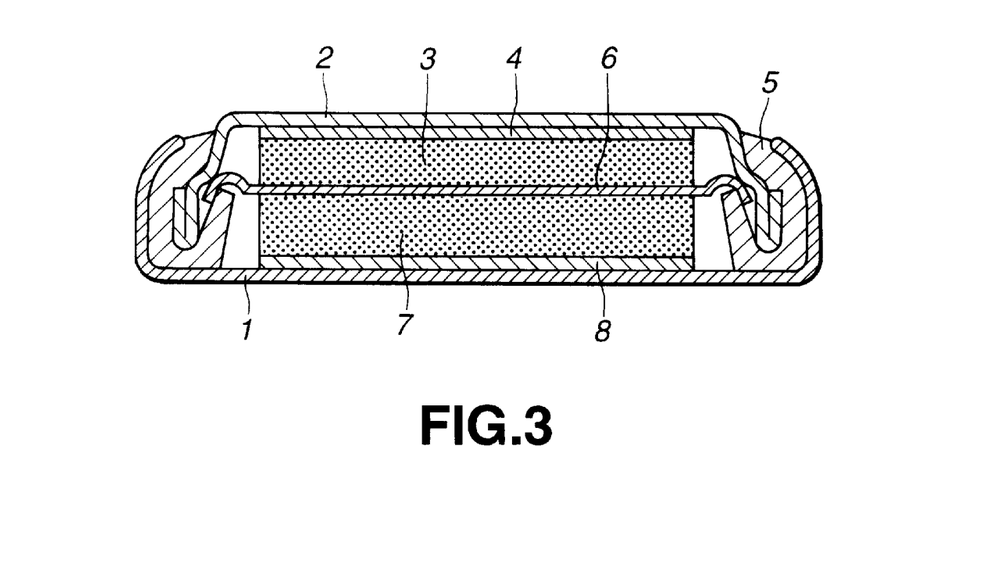
FIG. 3 is a schematic structure of a coin-type battery employed to evaluate the characteristics achieved with the present invention.

The charging/discharging performance of each of the batteries manufactured by using the lithium titanate samples A1 to A7, B1 to B3, C1 and C2 and A to C according to Examples 4 to 15 and Comparative Examples 3 to 6 was measured. FIG. 3 is an overall structural view showing a non-aqueous electrolyte battery for use in the evaluation.

The coin batteries manufactured by using the materials according to the examples and the comparative examples will now be described in detail.

Initially, 5 parts by weight of graphite serving as a conductive material, and 5 parts by weight of polyvinylidene fluoride, serving as a binder, were added to 90 parts by weight of hydrogen lithium titanate, serving as the active material. The mixture was kneaded and dispersed in a mortar. Then, NMP in a small quantity was successively added so that a mix in the form of slurry was prepared. The mix was dried at a temperature of 120° C. for 2 hours, and then pulverized in a mortar so that dry powder mix was obtained. The powder mix was charged into an electrode collector 8 in the form of a net made of stainless steel (SUS304), followed by compression-molding the powder mix to have an outer diameter of 15 mm and a thickness of 0.2 mm so that pellet 7 was manufactured. The pellet 7 was dried in a vacuum at 120° C. for 2 hours.

Then, metal lithium 3, which was used to form a counter electrode and which had a thickness of 1.0 mm, was punched by a circular cutter having an outer diameter of 16 mm, and then crimped to a cup 2. A separator 6 in the form of a fine-porous polypropylene film, having a predetermined size realized by punching and a thickness of 25 μm, was placed on the metal lithium 3. The separator 6 was thus inserted into a structure in which a polypropylene sealing gasket 5 was attached to the cup 2. Then, an electrolyte obtained by, at a ratio of 1 mole/l, dissolving $LiPF_5$ in a solvent in which propylene carbonate (PC), ethylene carbonate (EC) and 1, 2 dimethoxyethane (DME) were mixed in the same quantities. The electrolyte was dripped.

Then, the pellet 7 was placed, and then a can 1 composed of two layers and manufactured by nickel-plating stainless steel (SUS304) was placed to cover the structure. The sealing opening was caulked so as to be sealed. Thus, a coin type non-aqueous electrolyte secondary battery having an outer diameter of 20 mm and a height of 1.6 mm was manufactured.

Each of the thus-manufactured coin type batteries was charged with a constant electric current of 1 mA at ambient temperatures to a level of 2.5 V. Then, the batteries were discharged to a level of 1.0 V. The charging/discharging capacities were measured.

Figure 4:
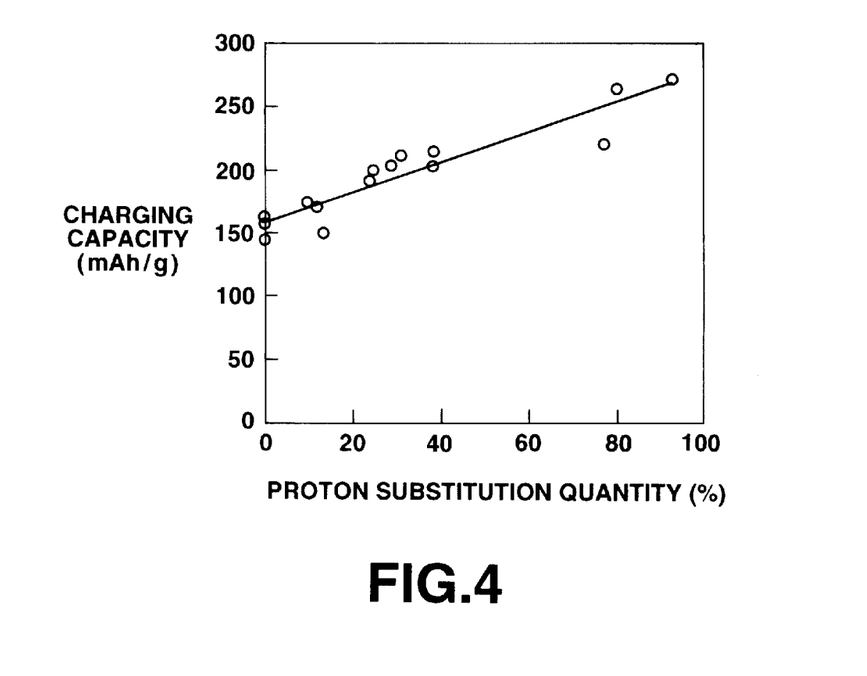
FIG. 4 is a graph showing dependency of the charging/discharging capacity on a proton substitution ratio.

Results of the confirmation of the largest particle size, the specific surface area, the amount of voids and the charging capacity of the coin type battery comprising the counter electrode made of metal lithium are shown in FIGS. 2 and 4.

TABLE 2

| Examples | Samples | Chemical Compositions | Largest Particle Sizes $\mu m$ |
|---|---|---|---|
| Comparative Example 3 | A | $Li_{1.45}Ti_{1.65}O_4$ | 0.1–0.2 |
| Example 4 | A1 | $H_{0.14}Li_{1.24}Ti_{1.66}O_4$ | 0.1–0.2 |
| Example 5 | A2 | $H_{0.32}Li_{1.08}Ti_{1.65}O_{45}$ | 0.1–0.2 |
| Example 6 | A3 | $H_{0.40}Li_{0.96}Ti_{1.66}O_4$ | 0.1–0.2 |
| Example 7 | A4 | $H_{0.43}Li_{0.88}Ti_{1.67}O_4$ | 0.1–0.2 |
| Example 8 | A5 | $H_{0.54}Li_{0.80}Ti_{1.67}O_4$ | 0.1–0.2 |
| Example 9 | A6 | $H_{1.09}Li_{0.16}Ti_{1.68}O_4$ | 0.1–0.2 |
| Example 10 | A7 | $H_{1.28}Li_{0.02}Ti_{1.67}O_4$ | 0.1–0.2 |
| Comparative Example 4 | B | $Li_{1.43}Ti_{1.65}O_4$ | 0.13–0.2 |
| Example 11 | B1 | $H_{0.16}Li_{1.14}Ti_{1.67}O_4$ | 0.13–0.2 |
| Example 12 | B2 | $H_{0.35}Li_{0.97}Ti_{1.67}O_4$ | 0.13–0.2 |
| Example 13 | B3 | $H_{1.05}Li_{0.18}Ti_{1.69}O_4$ | 0.13–0.2 |
| Comparative Example 5 | C | $Li_{1.44}Ti_{1.65}O_4$ | 0.2–0.4 |
| Example 14 | C1 | $H_{0.19}Li_{1.16}Ti_{1.66}O_4$ | 0.2–0.4 |
| Example 15 | C2 | $H_{0.53}Li_{0.75}Ti_{1.68}O_4$ | 0.2–0.4 |
| Comparative Example 6 | D | $Li_{1.17}Ti_{1.81}O_4$ | 0.5–1.0 |

| Examples | Specific Surface Areas $m^2/g$ | Amounts of Voids ml/g | Charging Capacities mAh/g | pH |
|---|---|---|---|---|
| Comparative Example 3 | 63.0 | 0.43 | 163 | 11.6 |
| Example 4 | 62.2 | 0.48 | 175 | 11.2 |
| Example 5 | 59.3 | 0.49 | 193 | 9.3 |
| Example 6 | 57.2 | 0.43 | 204 | 8.0 |
| Example 7 | 56.7 | 0.50 | 212 | 7.8 |
| Example 8 | 52.8 | 0.56 | 215 | 7.6 |
| Example 9 | 60.2 | 0.48 | 264 | 7.4 |
| Example 10 | 62.2 | 0.43 | 271 | 5.6 |
| Comparative Example 4 | 26.4 | 0.18 | 158 | 12.3 |
| Example 11 | 29.1 | 0.20 | 171 | 9.2 |
| Example 12 | 31.4 | 0.21 | 200 | 8.2 |
| Example 13 | 32.5 | 0.20 | 221 | 7.5 |
| Comparative Example 5 | 6.1 | 0.03 | 145 | 11.5 |
| Example 14 | 6.6 | 0.02 | 151 | 8.9 |
| Example 15 | 7.9 | 0.05 | 204 | 8.3 |
| Comparative Example 6 | 0.9 | 0.01 | 83 | 3.7 |

The basic conditions of the experiments of the comparative examples and the examples and shown in Table 2 were such that sample A was fired at a temperature of 550° C. in the atmosphere for 3 hours, sample B was fired at a temperature of 625° C. for 3 hours and sample C was fired at 700° C. for 3 hours. After the lithium titanate was fired, the water and acid processes were performed so that the proton substitution quantity was changed.

As can be understood from Table 2, a comparison was made with the charging capacity of about 150 mAh/g in one electronic reaction of commercial lithium titanate to form the 1.5 V lithium-ion secondary battery. On the other hand, Comparative Example 3, which was not subjected to the proton substitution, realized a considerably large charging capacity of 160 mAh/g or greater.

The examples A1 to A7 subjected to the proton substitution according to the present invention had charging/discharging capacities in an ascending order as A<A1<A2<A3<A4<A5<A6<A7. Similarly, examples B1 to B7 had charging/discharging capacities in an ascending order as B<B1<B2<B3. Also examples C to C2 have charging/discharging capacities in an ascending order as C<C1<C2. These results confirm that a great reflection was made on the charging capacity in proportion to the proton substitution quantity.

To evaluate influences exerted by the temperature, a charging capacity of lithium titanate fired at 800° C. was shown in the portion of Comparative Example 6.

Comparative Example 6 resulted in a specific surface area of 0.9 $m^2$/g which was 1/6 of that realized by Comparative Example 3. Moreover, a charging capacity of 83 mAh/g, which was about 50%, was realized. Therefore, a great influence of the baking temperature on the charging capacity was confirmed.

As shown in FIG. 4, the results confirm that the proton substitution quantity and the charging capacity have a proportional relationship. That is, the charging capacity is enlarged in proportion to the proton substitution quantity. Thus, a satisfactory effect can be obtained when lithium titanate is subjected to the proton substitution. The specific surface area is enlarged in inverse proportion to the firing temperature in the order as A (550° C.)>B (625° C.)>C (700° C.). Thus, the reaction area can be enlarged, causing the charging capacity to be enlarged. When an appropriate combination with a condition under which the proton substitution quantity can be enlarged is employed, the effect of the present invention can furthermore be improved even under a low firing condition.

Although a greater charging capacity can be expected in proportion to the proton substitution quantity, control of the proton substitution quantity by the water and acid processes cannot easily be performed. Moreover, the examples of the present invention confirm the fact that the charging capacity disperses greatly in proportion to the proton substitution quantity. Therefore, it is preferable that the proton substitution quantity according to the present invention satisfies a proton substitution region expressed by the general formula $H_xLi_{y-x}Ti_zO_4$ (where $y \geq x > 0$, $0.8 \leq y \leq 2.7$ and $1.3 \leq z \leq 2.2$). The foregoing conditions is a preferred condition for use as the material according to the present invention as a material for a battery.

It is understood that certain modifications and changes to the preferred embodiments described herein will be apparent to those skilled in the art. Such changes and modifications can be made without departing from the spirit and scope of the present invention and without diminishing its intended advantages. Therefore, the appended claims are intended to cover such changes and modifications.

What is claimed is:

1. A method of manufacturing a hydrogen lithium titanate compound, the method comprising the steps of:
   bringing a lithium titanate compound into contact with an acid, the lithium titanate expressed by a general formula $Li_yTi_zO_4$ where $0.8 \leq y \leq 2.7$ and $1.3 \leq z \leq 2.2$; and
   substituting protons for lithium ions in said lithium titanate compound to form hydrogen lithium titanate, the hydrogen lithium titanate expressed by a general formula $H_xLi_{y-x}Ti_zO_4$, where $y \geq x > 0$, $0.8 \leq y \leq 2.7$ and $1.3 \leq z \leq 2.2$.

2. A method for manufacturing hydrogen lithium titanate according to claim 1, wherein the acid is selected from the group consisting of: acetic acid; hydrochloric acid; nitric acid, sulfuric acid and formic acid.

3. A method of manufacturing hydrogen lithium titanate according to claim 1, further comprising the steps of:
- a first step for causing a titanium compound and an ammonia compound to react with each other in an aqueous solution to form a titanate compound;
- a second step for causing the titanate compound and a lithium compound to react with each other in an aqueous solution to form a lithium titanate hydrate; and
- a third step for subjecting the lithium titanate hydrate to heat treatment to form the lithium titanate.

4. A method for manufacturing hydrogen lithium titanate according to claim 3, wherein the second step is further defined by subjecting the titanate compound and the lithium compound to a hydrothermal process in an aqueous solution to form the lithium titanate hydrate.

5. A method for manufacturing hydrogen lithium titanate according to claim 3, wherein the third step is further defined by subjecting lithium titanate hydrate to heat treatment which is performed in a temperature range from 200° C. to 800° C.

6. A method of manufacturing hydrogen lithium titanate according to claim 1, wherein a mixture of titanium oxide and a lithium compound is subjected to heat treatment at temperatures of 500° C. to 900° C. so that lithium titanate expressed by general formula $$Li_yTi_zO_4$$

(where $0.8 \leq y \leq 2.7$ and $1.3 \leq z \leq 2.2$) is prepared.

7. A method of manufacturing hydrogen lithium titanate according to claim 1, further comprising the steps of:
- suspending the lithium titanate compound in a solvent;
- thereafter, adding the acid.

8. A hydrogen lithium titanate compound produced by subjecting a lithium titanate compound to an acid process.

9. The hydrogen lithium titanate compound of claim 8 having a pH of less than 11.6.

10. A hydrogen lithium titanate compound having a general formula:

$$H_xLi_{y-x}Ti_zO_4,$$

where $y \geq x > 0$, $0.8 \leq y \leq 2.7$ and $1.3 \leq z \leq 2.2$.

11. Hydrogen lithium titanate according to claim 10, wherein the hydrogen lithium titanate is formed into particles and structured to have voids in the particles.

12. Hydrogen lithium titanate according to claim 11, wherein a largest particle size is 0.05 μm to 50 μm.

13. Hydrogen lithium titanate according to claim 11, wherein the specific surface area is 0.01 m$^2$/g to 300 m$^2$/g.

14. A method of manufacturing a hydrogen lithium titanate compound, the method comprising the steps of:
- bringing a lithium titanate compound into contact with an acid; and
- substituting protons for lithium ions in said lithium titanate compound to form hydrogen lithium titanate.

15. A method of manufacturing hydrogen lithium titanate according to claim 14, wherein the acid is selected from the group consisting of: hydrochloric acid; nitric acid; sulfuric acid; acetic acid; and formic acid.

16. A method of manufacturing hydrogen lithium titanate according to claim 14, wherein the lithium titanate compound is expressed by a general formula $$Li_yTi_zO_4,$$

wherein $0.8 \leq y \leq 2.7$ and $1.3 \leq z \leq 2.2$.

17. A method of manufacturing hydrogen lithium titanate according to claim 14, wherein the hydrogen lithium titanate is expressed by a general formula $$H_xLi_{y-x}Ti_zO_4,$$

wherein $y \geq x > 0$, $0.8 \leq y \leq 2.7$ and $1.3 \leq z \leq 2.2$.

18. A method of manufacturing hydrogen lithium titanate according to claim 14, further comprising the steps of:
- causing a titanium compound and an ammonia compound to react with each other in an aqueous solution to form a titanate compound;
- causing the titanate compound and a lithium compound to react with each other in an aqueous solution to form a lithium titanate hydrate; and
- subjecting the lithium titanate hydrate to heat treatment to form the lithium titanate.

* * * * *